(12) United States Patent
Akiyama

(10) Patent No.: US 9,010,938 B2
(45) Date of Patent: Apr. 21, 2015

(54) PROJECTOR WITH MULTIPLE DIFFERENT TYPES OF ILLUMINATION DEVICES

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 559 days.

(21) Appl. No.: 13/177,160

(22) Filed: Jul. 6, 2011

(65) Prior Publication Data

US 2012/0026469 A1 Feb. 2, 2012

(30) Foreign Application Priority Data

Jul. 30, 2010 (JP) ................................ 2010-171625

(51) Int. Cl.
*G03B 21/20* (2006.01)
*G03B 21/14* (2006.01)
*G02B 27/14* (2006.01)
*G03B 21/16* (2006.01)

(52) U.S. Cl.
CPC .............. *G03B 21/14* (2013.01); *G02B 27/142* (2013.01); *G02B 27/149* (2013.01); *G03B 21/16* (2013.01); *G03B 21/204* (2013.01); *G03B 21/208* (2013.01)

(58) Field of Classification Search
CPC ........... G02B 27/0994; G02B 27/1026; G03B 21/208; G03B 21/204
USPC ..................................................... 353/38, 94
See application file for complete search history.

(56) References Cited

U.S. PATENT DOCUMENTS

| | | | |
|---|---|---|---|
| 8,167,440 B2* | 5/2012 | Sato et al. ....................... 353/99 |
| 2004/0233664 A1* | 11/2004 | Beeson et al. ................. 362/231 |
| 2005/0219476 A1* | 10/2005 | Beeson et al. .................. 353/98 |
| 2006/0164726 A1* | 7/2006 | Morejon et al. .............. 359/495 |
| 2008/0158512 A1* | 7/2008 | Mizushima et al. ............ 353/20 |
| 2009/0027624 A1* | 1/2009 | Huang ............................ 353/31 |
| 2009/0201469 A1* | 8/2009 | Vissenberg et al. ............. 353/97 |
| 2011/0051102 A1* | 3/2011 | Ogura et al. .................... 353/85 |
| 2011/0228232 A1 | 9/2011 | Sakata et al. |
| 2011/0292349 A1* | 12/2011 | Kitano et al. ................... 353/31 |
| 2011/0304831 A1* | 12/2011 | Yoshigai ......................... 353/85 |
| 2012/0019786 A1* | 1/2012 | Kimura .......................... 353/31 |

FOREIGN PATENT DOCUMENTS

| | | |
|---|---|---|
| JP | A-2004-327361 | 11/2004 |
| JP | A-2011-197212 | 10/2011 |

* cited by examiner

*Primary Examiner* — Sultan Chowdhury
*Assistant Examiner* — Bao-Luan Le
(74) *Attorney, Agent, or Firm* — Oliff PLC

(57) ABSTRACT

A projector according to an embodiment of the invention includes: an illumination device adapted to generate an illumination light; and a light modulation device adapted to modulate the illumination light in accordance with image information, wherein the illumination device includes a first illumination device including a fluorescence generation section adapted to generate a fluorescence from an excitation light generated by a first solid-state light source, and a second illumination device including a rod integrator optical system adapted to equalize an in-plane light intensity distribution of a colored light generated by a second solid-state light source.

8 Claims, 10 Drawing Sheets

PROJECTOR WITH MULTIPLE DIFFERENT TYPES OF ILLUMINATION DEVICES

BACKGROUND

1. Technical Field

The present invention relates to a projector.

2. Related Art

In the past, there has been known a projector provided with an illumination device including a solid-state light source for generating excitation light and a fluorescence generation section for generating a fluorescence from the excitation light and for generating illumination light, a light modulation device for modulating the illumination light from the illumination device in accordance with image information, and a projection optical system for projecting the light from the light modulation device (see, e.g., JP-A-2004-327361). According to the projector of the related art, it becomes possible to project a desired high-luminescent color image using a plurality of solid-state light sources for generating the excitation light with a specific wavelength.

However, in the related art projector, since all of the colored lights used in the projector are generated by generating the fluorescence from the excitation light, the thermal load applied to the fluorescent layer is large, which causes a problem that it is difficult to achieve further high-luminance projection.

SUMMARY

An advantage of some aspects of the invention is to provide a projector capable of achieving further high-luminance projection compared to the related art projector.

[1] A projector according to one aspect of the invention includes: an illumination device adapted to generate an illumination light, a light modulation device adapted to modulate the illumination light from the illumination device in accordance with image information, and a projection optical system adapted to project a light from the light modulation device, wherein the illumination device includes a first illumination device including at least one first solid-state light source adapted to generate an excitation light, a fluorescence generation section adapted to generate a fluorescence from the excitation light generated by the first solid-state light source, and a lens integrator optical system adapted to equalize an in-plane light intensity distribution of the fluorescence from the fluorescence generation section, and a second illumination device including at least one second solid-state light source adapted to generate a colored light, and a rod integrator optical system adapted to equalize an in-plane light intensity distribution of the colored light generated by the second solid-state light source.

Therefore, according to the projector of this aspect of the invention, since it is arranged that the specific colored light is directly generated from the second solid-state light source, it becomes possible to reduce the thermal load applied to the fluorescent layer, and as a result, it becomes possible to achieve higher luminance than in the related art projector.

Further, according to the projector of this aspect of the invention, since the first illumination device using the fluorescence generated from the excitation light generated by the first solid-state light source as the illumination light and the second illumination device using the colored light generated by the second solid-state light source as the illumination light without modification are provided as the illumination device, by generating the colored light (e.g., the green light) having light efficiency, which becomes higher in the case of using the fluorescence generated from the excitation light generated by the solid-state light source as the illumination light than in the case of using the colored light generated by the solid-state light source as the illumination light without modification, using the first illumination device, and generating the colored light (e.g., the blue light) having light efficiency, which becomes higher in the case of using the colored light generated by the solid-state light source as the illumination light without modification than in the case of using the fluorescence generated from the excitation light generated by the solid-state light source as the illumination light, using the second illumination device, it becomes possible to further enhance the light efficiency to thereby achieve further increase in luminance.

It should be noted that the colored light having the light efficiency constant regardless of whether the colored light generated by the solid-state light source is used as the illumination light without modification or the fluorescence generated from the excitation light generated by the solid-state light source is used as the illumination light, and the colored light (e.g., the red light) having the light efficiency, which becomes higher in the case of using the colored light generated by the solid-state light source as the illumination light without modification than in the case of using the fluorescence generated from the excitation light generated by the solid-state light source as the illumination light, but having a small difference in light efficiency between the cases, can be generated by either of the first illumination device and the second illumination device.

Further, according to the projector of this aspect of the invention, since the in-plane light intensity distribution in the colored light from the second solid-state light source is equalized using the rod integrator optical system, which has slightly low light efficiency but is capable of equalizing the light from the solid-state light source in the second illumination device, while the in-plane light intensity distribution in the fluorescence from the fluorescence generation section is equalized using the lens integrator optical system having high light efficiency in the first illumination device, it becomes possible to project a projection image with high light efficiency and a little variation in brightness.

It should be noted that the "lens integrator optical system" denotes an integrator optical system provided with a plurality of lens arrays and overlapping lenses, dividing the incident light into a plurality of partial light beams, and overlapping the plurality of partial light beams in the illuminated area to thereby equalize the in-plane light intensity distribution of the light.

Further, the "rod integrator optical system" denotes an integrator optical system provided with an integrator rod, and multiply reflecting the incident light inside the integrator rod to thereby equalize the in-plane light intensity distribution of the light.

[2] In the projector of the above aspect of the invention, it is preferable that the first illumination device includes a plurality of the first solid-state light sources, and the second illumination device includes a plurality of the second solid-state light sources.

By adopting such a configuration, it becomes possible to achieve further increase in luminance using a plurality of solid-state light sources.

[3] In the projector of the above aspect of the invention, it is preferable that the first solid-state light source and the second solid-state light source are each formed of a semiconductor laser.

Since the semiconductor laser is small in size and high in power, by adopting such a configuration as described above, downsizing and increase in power of the first and second illumination devices becomes possible.

It should be noted that since the semiconductor laser has the feature described above, if the semiconductor laser is used as the first solid-state light source and the second solid-state light source in the projector according to the second aspect of the invention, it becomes possible to integrate the first solid-state light source and the second solid-state light source at high density, and further increase in power of the first illumination device and the second illumination device becomes possible.

[4] In the projector of the above aspect of the invention, it is preferable that the lens integrator optical system is configured so as to emit a fluorescence with a uniform polarization direction as the fluorescence, and the rod integrator optical system is configured so as to emit a colored light with a uniform polarization direction as the colored light.

By adopting such a configuration as described above, it becomes possible to provide the optimum configuration in the projector particularly provided with the liquid crystal light modulation device as the light modulation device.

[5] In the projector of the above aspect of the invention, it is preferable that the rod integrator optical system includes an integrator rod adapted to internally reflect the colored light multiply, a reflecting mirror disposed so as to have contact with an entrance surface of the integrator rod, and provided with a colored light introduction hole adapted to introduce the colored light from the second solid-state light source, a λ/4 plate disposed so as to have contact with an exit surface of the integrator rod, and a reflective polarization plate disposed so as to have contact with an exit surface of the λ/4 plate.

By adopting such a configuration as described above, it becomes possible to efficiently convert the colored light generated by the second solid-state light source into the colored light with a uniform polarization direction.

[6] In the projector of the above aspect of the invention, it is preferable that the second illumination device further includes a scattering member adapted to input the colored light to the integrator rod in a scattered state.

By adopting such a configuration as described above, it becomes possible to introduce the colored light provided with a variety of incident angles into the integrator rod, and as a result, it becomes possible to make the in-plane light intensity distribution more uniform. It should be noted that the above configuration becomes particularly effective in the case of using the semiconductor laser, which is difficult to be equalized in the in-plane light intensity distribution, as the solid-state light source.

As the scattering member, a scattering plate obtained by roughening the surface of a glass plate, a scattering plate obtained by coating the surface of a glass plate with scattering paint, a scattering plate obtained by internally dispersing scattering particles, for example, can be used. Further, it is also possible to form a scattering surface at a portion of the entrance surface of the integrator rod corresponding to the color introduction hole, and use the scattering surface as the scattering member.

[7] In the projector of the above aspect of the invention, it is preferable that the first illumination device includes a first illumination unit adapted to emit both of a red light and a green light, and the second illumination device includes a second illumination unit adapted to emit a blue light.

Regarding the blue light, since there exists the high-luminance solid-state light source having the light efficiency, which is higher in the case of using the colored light generated by the solid-state light source as the illumination light without modification than in the case of using the fluorescence generated from the excitation light generated by the solid-state light source as the illumination light, by adopting such a configuration as described above, it becomes possible to further improve the light efficiency to thereby achieve further increase in luminance.

[8] In the projector of the above aspect of the invention, it is preferable that the first illumination device includes a first illumination unit adapted to emit a green light, and the second illumination device includes two second illumination units, one being adapted to emit a red light, and the other being adapted to emit a blue light.

Regarding also the red light, since there exists the high-luminance solid-state light source having the light efficiency, which is higher in the case of using the colored light generated by the solid-state light source as the illumination light without modification than in the case of using the fluorescence generated from the excitation light generated by the solid-state light source as the illumination light, by adopting such a configuration as described above, it becomes possible to further improve the light efficiency to thereby achieve further increase in luminance.

[9] In the projector of the above aspect of the invention, it is preferable that the first solid-state light source generates the blue light having an intensity peak in a range of 430 nm through 450 nm, and the second solid-state light source in the second illumination unit adapted to generate the blue light generates the blue light having an intensity peak in a range of 450 nm through 480 nm.

In the case of using the blue light as the colored light, the blue light in a range of 450 nm through 480 nm is preferably used from a viewpoint of visibility, and in the case of using the blue light as the excitation light, the blue light in a range of 430 nm through 450 nm is preferably used from a viewpoint of generation efficiency of the fluorescence. Therefore, by adopting the configuration described above, it becomes possible to further improve the light efficiency to thereby achieve further increase in luminance.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, projectors according to embodiments of the invention will be explained based on the embodiments shown in the accompanying drawings.

First Embodiment

Figure 1:
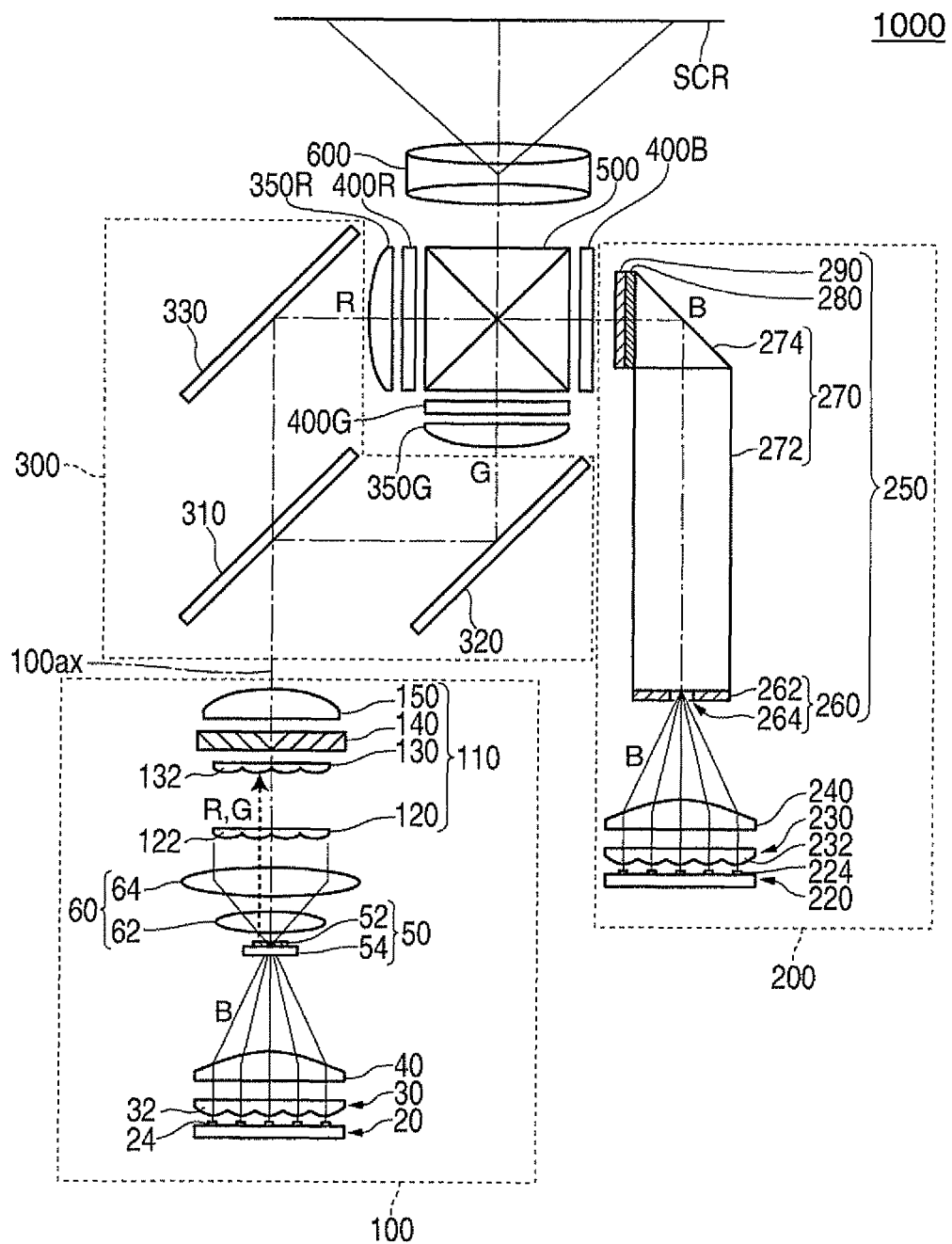
FIG. 1 is a plan view showing an optical system of a projector 1000 according to a first embodiment of the invention.

FIG. 1 is a plan view showing an optical system of a projector 1000 according to a first embodiment of the invention.

Figure 2:
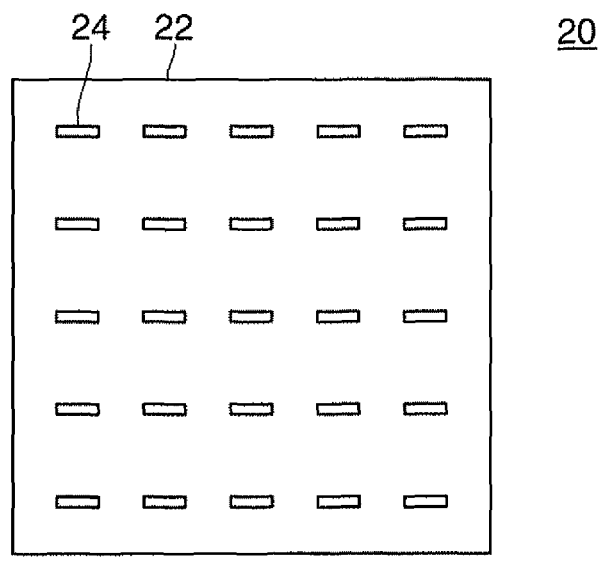
FIG. 2 is a diagram of a first solid-state light source array 20 in the first embodiment viewed from a collimator lens array 30 side.

FIG. 2 is a diagram of a first solid-state light source array 20 in the first embodiment viewed from a collimator lens array 30 side.

Figure 3A:
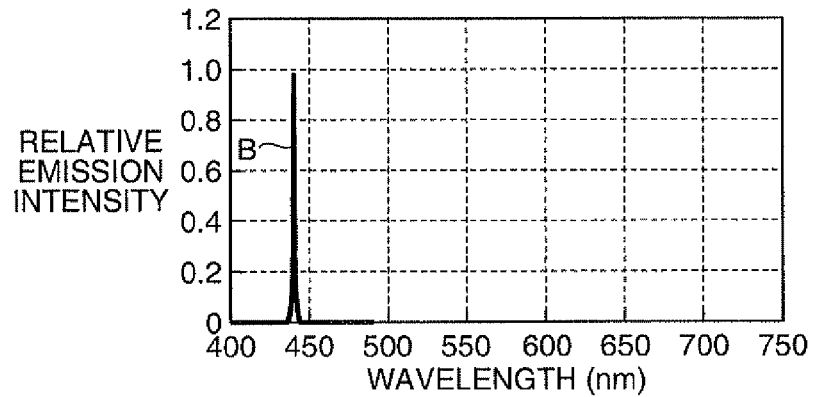
FIGS. 3A through 3C are graphs respectively showing the emission intensity characteristics of a first solid-state sight source 24, the emission intensity characteristics of a fluorescent material, and the emission intensity characteristics of a second solid-state light source 224 in the first embodiment.
Figure 3B:
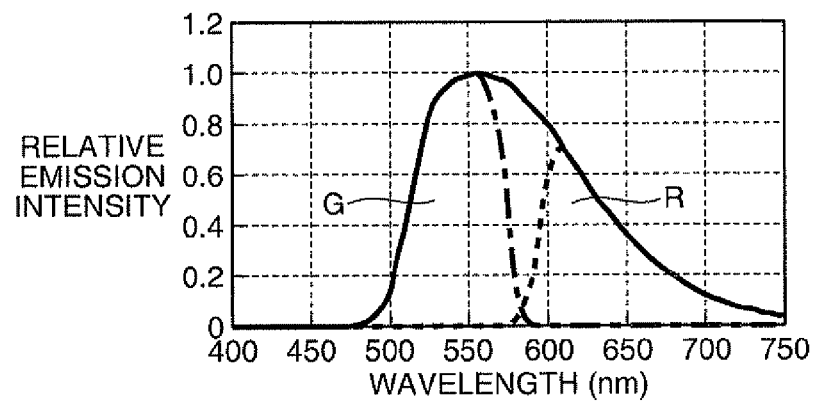
Figure 3C:
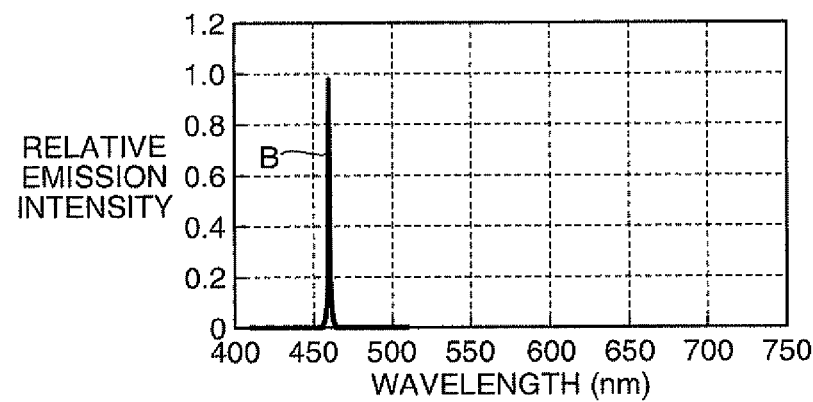

FIGS. 3A through 3C are graphs respectively showing the emission intensity characteristics of a first solid-state light source 24, the emission intensity characteristics of a fluorescent material, and the emission intensity characteristics of a second solid-state light source 224 in the first embodiment. FIG. 3A is a graph showing the emission intensity characteristics of the first solid-state light source 24, FIG. 3B is a graph showing the emission intensity characteristics of the fluorescent material included in a fluorescent layer 52, and FIG. 3C is a graph showing the emission intensity characteristics of the second solid-state light source 224. The emission intensity characteristics denote the characteristics of the light source regarding the wavelength and the intensity of the light emitted therefrom in response to application of the voltage, or the characteristics of the fluorescent material regarding the wavelength and the intensity of the light emitted therefrom in response to input of the excitation light. The vertical axes of the graphs represent the relative emission intensity assuming that the emission intensity at the wavelength at which the emission intensity is the highest is 1. The lateral axes of the graphs represent wavelength.

It should be noted that in each of the drawings the reference symbol R represents red light, the reference symbol G represents green light, and the reference symbol B represents blue light.

In the present specification and the drawings, the constituents (e.g., the housing and fixing members for fixing the constituents) having no direct implication on the optical system will be omitted from the description and the illustration.

As shown in FIG. 1, the projector 1000 according to the first embodiment is provided with a first illumination unit 100, second illumination unit 200, a color separation light guide optical system 300, three liquid crystal light modulation devices 400R, 400G, and 400B as a light modulation device, a cross dichroic prism 500, and a projection optical system 600.

The first illumination unit 100 is provided with a first solid-state light source array 20, a collimator lens array 30, a light collection optical system 40, a fluorescence generation section 50, a collimating optical system 60, and a lens integrator optical system 110. The first light source unit 100 emits both of the red light and the green light.

As shown in FIG. 2, the first solid-state light source array 20 has a substrate 22 and 25 first solid-state light sources 24 each for generating the excitation light (the blue light). In the first solid-state light source array 20, the 25 first solid-state light source 24 are arranged in a 5×5 matrix. In FIG. 2, the reference numeral is attached only to the upper leftmost one of the first solid-state light sources 24.

It should be noted that in the projector according to the present embodiment, the number of first solid-state light sources is not limited to 25. Further, in the case of using a plurality of first solid-state light sources, it is also possible to dispose each of the first solid-state light sources independently from each other. The same can be applied to second solid-state light sources described later.

The substrate 22 has a function of mounting the first solid-state light sources 24. Although the detailed explanation is omitted, the substrate 22 also has a function of intervening the power supply to the first solid-state light sources 24, a function of radiating the heat generated in the first solid-state light sources 24, and so on.

The first solid-state light sources 24 are each composed of a semiconductor laser for generating the blue light (with a peak emission intensity at a wavelength of 440 nm, see FIG. 3A) as the excitation light. Specifically, the first solid-state light sources 24 each fulfill the condition of generating the blue light having the intensity peak in a range of 430 nm through 450 nm. As shown in FIG. 2, the semiconductor laser has a rectangular emission area, and is configured so that the spread angle along the short side direction of the emission area becomes larger than the spread angle along the long side direction of the emission area. The dimension of the emission area in the semiconductor laser is 18 μm in the long side and 2 μm in the short side, for example.

As shown in FIG. 1, the collimator lens array 30 is disposed so as to correspond to the 25 first solid-state light sources 24, and has a plurality of collimator lenses 32 (the reference numeral is provided only to one located at the end in the drawing) for roughly collimating the light generated by the 25 first solid-state light sources 24, respectively. Although the explanation with illustration is omitted, the plurality of collimator lenses 32 is arranged in a 5×5 matrix.

Although the detailed explanation is omitted, the collimator lenses 32 are each formed of an aspherical planoconvex lens with a hyperboloidal entrance surface and a planar exit surface.

The light collection optical system 40 collects the light from the collimator lens array 30 to a predetermined collection position. Although the detailed explanation is omitted, the light collection optical system 40 is formed of an aspherical planoconvex lens with a planar entrance surface and a hyperboloidal exit surface.

The fluorescence generation section 50 generates the fluorescence (the red light and the green light) from the excitation light (the blue light) generated by the first solid-state light sources 24. The fluorescence generation section 50 has a fluorescent layer 52 and a transparent member 54 for supporting the fluorescent layer 52. The fluorescence generation section 50 has a square plate-like shape as a whole, and is fixed to a predetermined position (see FIG. 1). The fluorescence generation section 50 is a so-called transmissive fluorescence generation section having the side, to which the excitation light (the blue light) is input, and the side, from which the generated fluorescence is emitted, opposed to each other.

The fluorescence generation section 50 is disposed at a position where the blue light collected by the light collection optical system 40 enters the fluorescent layer 52 in a defocused state.

The fluorescent layer 52 is formed of a layer including $(Y,Gd)_3(Al,Ga)_5O_{12}$:Ce as a YAG fluorescent material. It should be noted that the fluorescent layer can be formed of a layer including a YAG fluorescent material other than $(Y,Gd)_3(Al,Ga)_5O_{12}$:Ce, a layer including a silicate fluorescent material, or a layer including a TAG fluorescent material. Further, a layer including a mixture of a fluorescent material (e.g., a CaAlSiN3 red fluorescent material) for converting the excitation light into the red light and a fluorescent material (e.g., a β-SiALON green fluorescent material) for converting the excitation light into the green light can also be adopted.

The fluorescent layer 52 generates the fluorescence including the red light (having the emission intensity peak at around 610 nm) and the green light (having the emission intensity peak at around 550 nm) from the blue light emitted from the light collection optical system 40.

The transparent member 54 is made of, for example, quartz glass or optical glass.

On the light collection optical system 40 side of the fluorescent layer 52, there can be formed a layer (a so-called dichroic coat) for transmitting the blue light from the light collection optical system 40 and reflecting the fluorescence.

The collimating optical system 60 roughly collimates the fluorescence from the fluorescence generation section 50. As shown in FIG. 1, the collimating optical system 60 is provided with a first lens 62 and a second lens 64. The first lens 62 and the second lens 64 are each formed of a biconvex lens. It should be noted that the shapes of the first and second lenses are not limited to the shape described above, but can be the shapes with which the collimating optical system composed of the first and second lenses roughly collimate the light from the fluorescence generation section, in essence. Further, the number of lenses constituting the collimating optical system can be one, or more than two.

The lens integrator optical system 110 equalizes the in-plane light intensity distribution of the fluorescence. The lens integrator optical system 110 is provided with a first lens array 120, a second lens array 130, a polarization conversion element 140, and an overlapping lens 150.

As shown in FIG. 1, the first lens array 120 has a plurality of first small lenses 122 for dividing the light from the collimating optical system 60 into a plurality of partial light beams. The first lens array 120 has a function of a beam splitting optical element for splitting the light from the collimating optical system 60 into a plurality of partial light beams, and has a configuration of arranging the plurality of first small lenses 122 in a plane perpendicular to a first illumination light axis 100ax in a matrix with a plurality of rows and a plurality of columns. Although the explanation with illustration is omitted, the outer shape of the first small lens 122 is substantially similar to the outer shape of the image forming area as the light modulation area in the liquid crystal light modulation devices 400R, 400G.

The second lens array 130 has a plurality of second small lenses 132 corresponding to the first small lenses 122 of the first lens array 120. The second lens array 130 has a function of imaging the image of each of the first small lenses 122 of the first lens array 120 in the vicinity of the image forming areas of the liquid crystal light modulation devices 400R, 400G in cooperation with the overlapping lens 150. The second lens array 130 has a configuration of arranging the plurality of second small lenses 132 in a plane perpendicular to the first illumination light axis 100ax in a matrix with a plurality of rows and a plurality of columns.

The polarization conversion element 140 is a polarization conversion element for converting the each of the partial light beams, which are split into by the first lens array 120, into the light consisting of a substantially unique linearly-polarized light beam having a uniform polarization direction, and then emitting the light.

The polarization conversion element 140 has a polarization split layer for transmitting one linearly polarized component out of the polarization components included in the light from the collimating optical system G0 without modification while reflecting the other linearly polarized component in a direction perpendicular to the first illumination light axis 100ax, a reflecting layer for reflecting the other linearly polarized component, which is reflected by the polarization split layer, in a direction parallel to the first illumination light axis 100ax, and a λ/2 plate for converting the other linearly polarized component reflected by the reflecting plate into the one linearly polarized component. The lens integrator optical system 110 is provided with the polarization conversion element 140 to thereby emit the fluorescence having a uniform polarization direction.

The overlapping lens 150 makes the partial light beams from the polarization conversion element 140 overlap in the illuminated area. The overlapping lens 150 is an optical element for collecting each of the partial light beams and then overlapping the partial light beams in the vicinities of the image forming areas of the liquid crystal light modulation devices 400R, 400G. The overlapping lens 150 is disposed so that the optical axis of the overlapping lens 150 and the first illumination light axis 100ax become roughly identical to each other. It should be noted that it is also possible for the overlapping lens to be formed of a compound lens having a plurality of lenses combined with each other.

The second illumination unit 200 is provided with a second solid-state light source array 220, a collimator lens array 230, a light collection optical system 240, and a rod integrator optical system 250. The second illumination unit 200 emits the blue light as the colored light.

The second solid-state light source array 220 has a substrate 222 (the reference numeral is not shown) and 25 second solid-state light sources 224 each for generating the specific colored light (the blue light). The second solid-state light source array has substantially the same configuration as that of the first solid-state light source array 20 except the second solid-state light sources 224.

The second solid-state light sources 224 each have substantially the same configuration as that of each of the first solid-state light sources 24 except the point that it consists of a semiconductor laser for generating the blue light (having the emission intensity peak at around 460 nm; see FIG. 3C) as the colored light (i.e., the second solid-state light sources 224 each fulfill the condition of generating the blue light having the intensity peak in a range of 450 nm through 480 nm).

The collimator lens array 230 and the light collection optical system 240 has basically the same configurations as the collimator lens array 30 and the light collection optical system 40, respectively, and therefore, the explanation therefor will be omitted.

The rod integrator optical system 250 equalizes the in-plane light intensity distribution of the colored light (the blue light) generated by the second solid-state light sources 224. The rod integrator optical system 250 is provided with a reflecting mirror 260, an integrator rod 270, a λ/4 plate 280, and a reflective polarization plate 290. The exit surface of the rod integrator optical system 250 (i.e., the exit surface of the reflective polarization plate 290) is disposed in the vicinity of the liquid crystal light modulation device 400B.

The reflecting mirror 260 is disposed so as to have contact with the entrance surface of the integrator rod 270, and has a colored light introduction hole 264 for introducing the blue light generated by the second solid-state light sources 224 and transmitted through the collimator lens array 230 and the light collection optical system 240. The member denoted with the reference numeral 262 is a reflecting mirror main body, and the reflecting mirror main body 262 has a reflecting surface on the integrator rod 270 side.

The integrator rod 270 internally performs multiple reflection on the blue light. The integrator rod has a rod section 272 and a prism section 274. The entrance surface of the integrator rod 270 as a whole is the entrance surface of the rod section 272, and the exit surface thereof as a whole is the exit surface of the prism section 274.

The rod section 272 has a prismatic shape, and is solid-core. It should be noted that a hollow member can also be used as the rod section. Although the explanation with illustration is omitted, the cross-sectional shape of the rod section 272 is substantially similar to the outer shape of the image forming area as the light modulation area in the liquid crystal light modulation device 400B.

The prism section 274 has a function of deflecting the proceeding direction of the light, which is output from the rod section 272, toward the liquid crystal light modulation device 400B. The entrance surface and the exit surface of the prism section 274 have substantially the same shape as the cross-sectional shape of the rod section 272.

Although the explanation with illustration is omitted, the colored light introduction hole 264 in the reflecting mirror 260 is provided with a scattering member for inputting the blue light to the integrator rod 270 in a scattered state. The scattering member is formed of a scattering plate (i.e., a ground glass) obtained by roughening the surface of a glass plate.

It should be noted that a scattering member other than the scattering member described above can also be adopted. Further, if the in-plane light intensity distribution of the colored light can be equalized without the scattering member, the scattering member can be eliminated.

The λ/4 plate 280 is disposed so as to have contact with the exit surface of the integrator rod 270. The λ/4 plate 280 is a type of a wave plate for changing the polarization state of the light transmitted therethrough, and a shift of π/2 (¼ wavelength) between the phase of one polarization component and the phase of the other polarization component is caused in the light transmitted through the λ/4 plate 280. For example, when the light consisting of one linear polarization component is transmitted through the λ/4 plate once, the light is changed to the light consisting of a circular polarization component of one direction (e.g., clockwise). When the circularly polarized light of the one direction is transmitted through the λ/4 plate again, the light is changed to the light consisting of the other linear polarization component. When the light consisting of the other linear polarization component is further transmitted through the plate, the light is changed to the light consisting of a circular polarization component of the other direction (i.e., counterclockwise).

The reflective polarization plate 290 is disposed so as to have contact with the exit surface of the λ/4 plate 280. The reflective polarization plate 290 transmits one linear polarization component out of the polarization components included in the light from the λ/4 plate 280 without any modification, and reflects the other linear polarization component toward the λ/4 plate 280. As the reflective polarization plate 280, a wire grid reflective polarization plate, for example, can be used. Due to the reflective polarization plate 290, the rod integrator optical system 250 is configured so as to emit the blue light with a uniform polarization direction.

Here, the flow of the light in the rod integrator optical system 250 in the first embodiment will be explained.

The blue light from the light collection optical system 240 is firstly input from the colored light introduction hole 264 of the reflecting mirror 260, then multiply reflected inside the integrator rod 270, and then reaches the reflective polarization plate 290 via the λ/4 plate 280. The blue light consisting of one linear polarization component out of the blue light having reached the reflective polarization plate 290 is transmitted through the reflective polarization plate 290, and then input to the liquid crystal light modulation device 400B. The blue light consisting of the other linear polarization component is reflected by the reflective polarization plate 290, and then transmitted through the λ/4 plate 280 to thereby become the circular polarization component of the other direction, then transmitted through the integrator rod 270 and then reflected by the reflecting mirror 260, then transmitted through the integrator rod 270 again and then transmitted through the λ/4 plate 280 to thereby become the one linear polarization component, and is then input to the liquid crystal light modulation device 400B after passing through the reflective polarization plate 290. It should be noted that even in the case in which disturbance is caused in the polarization state due to, for example, the reflection inside the integrator rod 270, by repeating such a process as described above, the blue light is emitted from the rod integrator optical system 250 as the blue light consisting of the one linear polarization component.

The flow of the light in the rod integrator optical system 250 is as described above.

It should be noted that the part of the blue light, which is reflected by the reflective polarization plate 290, and reaches the reflecting mirror 260 via the integrator rod 270, is lost by passing through the colored light introduction hole 264. However, it becomes possible to reduce the amount of blue light to be lost by making the size of the colored light introduction hole 264 minute.

The color separation light guide optical system 300 is provided with a dichroic mirror 310, and reflecting mirrors 320, 330. The color separation light guide optical system 300 has a function of separating the light beam from the first illumination unit 100 into the red light and the green light, and respectively guiding the colored lights to the liquid crystal light modulation devices 400R, 400G to be the illumination objects.

Collecting lenses 300R, 300G are disposed between the color separation light guide optical system 300 and the liquid crystal light modulation devices 400R, 400G, respectively.

The dichroic mirror 310 is a mirror having a wavelength selective transmission film for reflecting the green light and transmitting the red light formed on a substrate.

The reflecting mirror 320 is a reflecting mirror for reflecting the green light component.

The reflecting mirror 330 is a reflecting mirror for reflecting the red light component.

The red light transmitted through the dichroic mirror 310 is reflected by the reflecting mirror 330, and then enters the image forming area of the liquid crystal light modulation device 400R for the red light after passing through the collecting lens 350R.

The green light reflected by the dichroic mirror 310 is further reflected by the reflecting mirror 320, and then enters the image forming area of the liquid crystal light modulation device 400G for the green light after passing through the collecting lens 350G.

The liquid crystal light modulation devices 400R, 400G, and 400B are for modulating the respective colored lights, which have been input thereto, in accordance with the image information to thereby form a color image, wherein the liquid crystal light modulation devices 400R, 400G become the illumination object of the first illumination unit 100, and the liquid crystal light modulation device 400B becomes the illumination object of the second illumination unit 200. It should be noted that, although not shown in the drawings, the entrance side polarization plates are disposed between the collecting lenses 350R, 350G and the liquid crystal light modulation devices 400R, 400G, and between the reflective polarization plate 290 of the second illumination unit 200 and the liquid crystal light modulation device 400B, respectively, so as to intervene therebetween, and the exit side polarization plates are disposed between the liquid crystal light modulation devices 400R, 400G, 400B and the cross dichroic prism 500, respectively, so as to intervene therebetween. The light modulation of the respective colored lights having entered is performed by the entrance side polarization plates, the liquid crystal light modulation devices 400R, 400G, and 400B, and the exit side polarization plates described above.

The liquid crystal light modulation devices 400R, 400G, and 400B are each a transmissive liquid crystal light modulation device having the light modulation area formed by encapsulating a liquid crystal material as an electro-optic material between a pair of transparent glass plates, and modulate the polarization direction of a single linearly polarized light emitted from the entrance side polarization plate in accordance with an image signal provided thereto using, for example, polysilicon TFTs as switching elements.

The cross dichroic prism 500 is an optical element for combining the optical images modulated for respective colored lights emitted from the respective exit side polarization plates to thereby form a color image. The cross dichroic prism 500 has a substantially rectangular planar shape composed of four rectangular prisms bonded to each other, and on the substantially X-shaped interfaces on which the rectangular prisms are bonded to each other, there are formed dielectric multilayer films. The dielectric multilayer film formed on one of the substantially X-shaped interfaces is for reflecting the red light, and the dielectric multilayer film formed on the other of the interfaces is for reflecting the blue light. The red light and the blue light are deflected by these dielectric multilayer films to have the proceeding direction aligned with the proceeding direction of the green light, thus the three colored lights are combined.

The color image emitted from the cross dichroic prism 500 is projected in an enlarged manner by the projection optical system 600 to form an image on the screen SCR.

Then, advantages of the projector 1000 according to the first embodiment will be explained.

According to the projector 1000 of the first embodiment, since it is arranged that the specific colored light (the blue light) is directly generated from the second solid-state light sources 224, it becomes possible to reduce the thermal load applied to the fluorescent layer 52, and as a result, it becomes possible to achieve higher luminance than in the related art projector.

Further, according to the projector 1000 of the first embodiment, since the first illumination unit 100 using the fluorescence (the red light and the green light) generated from the excitation light (the blue light) generated by the first solid-state light sources 24 as the illumination light, and the second illumination unit 200 using the colored light (the blue light) generated by the second solid-state light sources 224 as the illumination light without modification are provided as the illumination devices, by generating the green light using the first illumination unit 100 while generating the blue light using the second illumination unit 200, it becomes possible to further enhance the light efficiency to thereby achieve higher luminance.

Further, according to the projector 1000 of the first embodiment, since the in-plane light intensity distribution in the colored light from the second solid-state light sources 224 is equalized using the rod integrator optical system 250, which has slightly low light efficiency but is capable of equalizing the light from the solid-state light sources in the second illumination unit 200, while the in-plane light intensity distribution in the fluorescence from the fluorescence generation section 50 is equalized using the lens integrator optical system 110 having high light efficiency in the first illumination unit 100, it becomes possible to project a projection image with high light efficiency and a little variation in brightness.

Further, according to the projector 1000 of the first embodiment, since the first illumination unit 100 is provided with a plurality of first solid-state light sources 24 as the first solid-state light source, and the second illumination unit 200 is provided with a plurality of second solid-state light sources 224 as the second solid-state light source, it becomes possible to achieve higher luminance using the plurality of solid-state light sources.

Further, according to the projector 1000 of the first embodiment, since the first solid-state light sources 24 and the second solid-state light source 224 are formed of the semiconductor laser elements, downsizing and increase in output power of the first illumination unit 100 and the second illumination unit 200 becomes possible.

Further, according to the projector 1000 of the first embodiment, since the semiconductor laser elements are used as the first solid-state light sources 24 and the second solid-state light sources 224, it becomes possible to integrate the first solid-state light sources 24 and the second solid-state light sources 224 at high density, and thus it becomes possible to achieve further increase in output power of the first illumination unit 100 and the second illumination unit 200.

Further, according to the projector 1000 of the first embodiment, since the lens integrator optical system 110 is configured to emit the fluorescence aligned in the polarization direction as the fluorescence, and the rod integrator optical system 250 is configured to emit the colored light aligned in the polarization direction as the colored light, it becomes possible to obtain the optimum configuration for the projector provided with the liquid crystal light modulation devices as the light modulation devices.

Further, according to the projector 1000 of the first embodiment, since the rod integrator optical system 250 is provided with the integrator rod 270, the reflecting mirror 260, the λ/4 plate 280, and the reflective polarization plate 290, it becomes possible to efficiently convert the colored light generated by the second solid-state light sources 224 into the colored light aligned in the polarization direction.

Further, according to the projector 1000 of the first embodiment, since the second illumination unit 200 is provided with the scattering member for inputting the colored light to the integrator rod 270 in the scattered state, it becomes possible to introduce the colored light having a variety of incident angles in the integrator rod 270, and as a result, it becomes possible to make the in-plane light intensity distribution more uniform.

Further, according to the projector 1000 of the first embodiment, since the first illumination unit 100 for emitting both of the red light and the green light is provided as the first illumination device, and the second illumination unit 200 for emitting the blue light is provided as the second illumination device, and the second illumination unit 200 emits the blue light for which there exists the solid-state light source having higher light efficiency and higher luminance when the colored light generated by the solid-state light source is used as the illumination light without modification, it becomes possible to further enhance the light efficiency to thereby achieve further increase in luminance.

Further, according to the projector 1000 of the first embodiment, since the first solid-state light sources 24 generate the blue light having the intensity peak at 440 nm and the second solid-state light sources 224 in the second illumination unit 200 for emitting the blue light generate the blue light having the intensity peak at 460 nm, and therefore, there are used the second solid-state light sources 224 for generating the blue light preferable from the viewpoint of the visibility and the first solid-state light sources 24 for generating the blue light preferable from the viewpoint of the generation efficiency of the fluorescence, it becomes possible to further improve the light efficiency to thereby achieve further increase in luminance.

Second Embodiment

Figure 4:
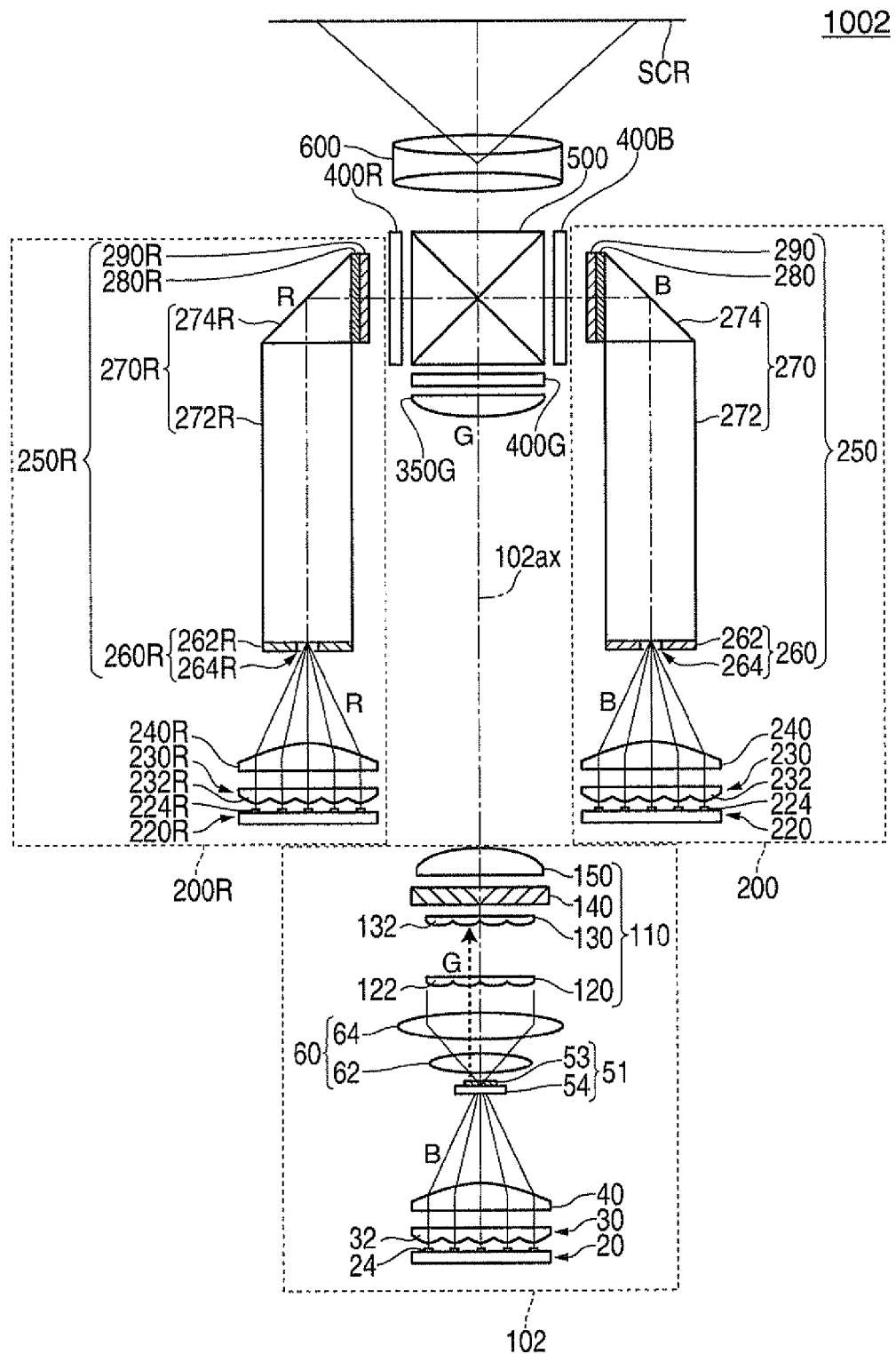
FIG. 4 is a plan view showing an optical system of a projector 1002 according to a second embodiment of the invention.

FIG. 4 is a plan view showing an optical system of a projector 1002 according to a second embodiment of the invention.

Figure 5A:
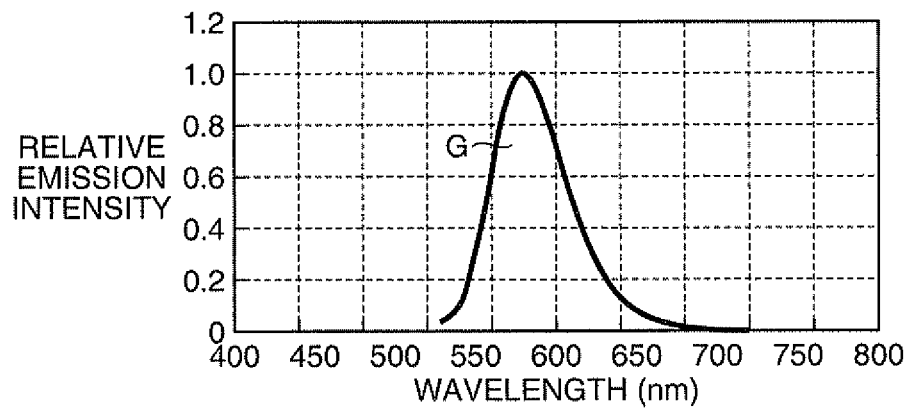
FIGS. 5A and 5B are graphs respectively showing the emission intensity characteristics of a fluorescent material and the emission intensity characteristics of a second solid-state light source 224R in the second embodiment.
Figure 5B:
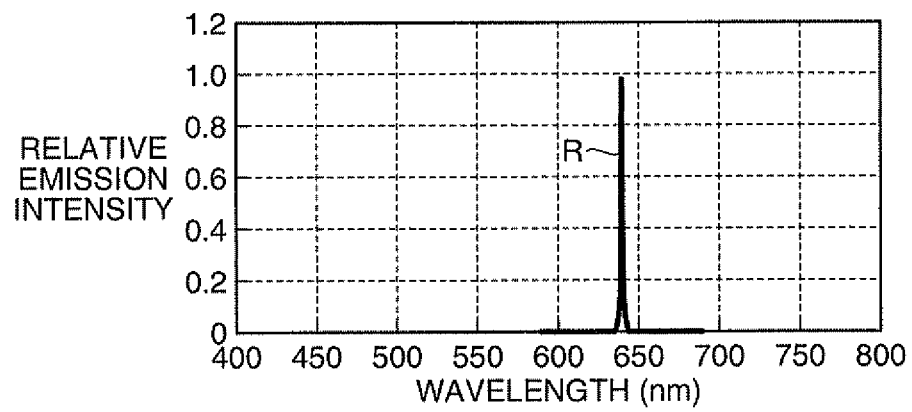

FIGS. 5A and 5B are graphs respectively showing the emission intensity characteristics of a fluorescent material and the emission intensity characteristics of a second solid-state light source 224R in the second embodiment. FIG. 5A is a graph showing the emission intensity characteristics of the fluorescent material included in a fluorescent layer 53, and FIG. 5B is a graph showing the emission intensity characteristics of the second solid-state light sources 224R.

The projector 1002 according to the second embodiment basically has a configuration substantially the same as that of the projector 1000 according to the first embodiment, but is different from the case of the projector 1000 according to the first embodiment in the configuration of the illumination device. Specifically, as shown in FIG. 4, in the projector 1002 according to the second embodiment, there are provided a first illumination unit 102 for emitting the green light as the first illumination device, and a second illumination unit 200R for emitting the red light and the second illumination unit 200 emitting the blue light as the second illumination device. Further, in conjunction therewith, the projector 1002 is not provided with the color separation light guide optical system or the collecting lens for the red light.

The first illumination unit 102 has basically the same configuration as that of the first illumination unit 100 in the first embodiment except the configuration of a fluorescence generation section 51.

The fluorescence generation section 51 has basically the same configuration as that of the fluorescence generation section 50 in the first embodiment except the point of being provided with a fluorescent layer 53 for generating the fluorescence including the green light (having the emission intensity peak at around 570 nm; see FIG. 5A) from the blue light output from the light collection optical system 40.

The fluorescent layer 53 consists of a layer including a fluorescent material (e.g., a β-SiALON green fluorescent material) for converting the blue light into the green light.

The second illumination unit 200R has basically the same configuration as that of the second illumination unit 200 in the first embodiment except the configuration of the second solid-state light sources 224R.

The second solid-state light sources 224R have substantially the same configuration as that of the first solid-state light sources 24 except the point of consisting of the semiconductor laser for generating the red light (having the emission intensity peak at around 640 nm; see FIG. 5B) as the colored light.

As described above, although different from the case of the projector 1000 according to the first embodiment in the configuration of the illumination devices, since the projector 1002 according to the second embodiment is arranged to directly generate the specific colored light (the blue light and the red light) from the second solid-state light sources 224, 224R similarly to the projector 1000 according to the first embodiment, it becomes possible to reduce the thermal load applied to the fluorescent layer 53, and as a result, it becomes possible to achieve further increase in luminance compared to the related art projector.

Further, according to the projector 1002 of the second embodiment, similarly to the projector 1000 according to the first embodiment, since the first illumination unit 102 using the fluorescence (the green light) generated from the excitation light (the blue light) generated by the first solid-state light sources 24 as the illumination light, and the second illumination unit 200 using the colored light (the blue light) generated by the second solid-state light sources 224 as the illumination light without modification are provided as the illumination devices, by generating the green light using the first illumination unit 102 while generating the blue light using the second illumination unit 200, it becomes possible to further enhance the light efficiency to thereby achieve higher luminance.

Further, similarly to the projector 1000 according to the first embodiment, according to the projector 1002 of the second embodiment, since the in-plane light intensity distribution in the colored light from the second solid-state light sources 224, 224R is equalized using the rod integrator optical systems 250, 250R, which have slightly low light efficiency but are capable of equalizing the light from the solid-state light sources in the second illumination units 200, 200R, while the in-plane light intensity distribution in the fluorescence from the fluorescence generation section 51 is equalized using the lens integrator optical system 110 having high light efficiency in the first illumination unit 102, it becomes possible to project a projection image with high light efficiency and a little variation in brightness.

Further, according to the projector 1002 of the second embodiment, since the first illumination unit 102 for emitting the green light is provided as the first illumination device, and the second illumination unit 200R for emitting the red light and the second illumination unit 200 for emitting the blue light are provided as the second illumination device, and the second illumination unit 200R emits the red light for which there exists the solid-state light source having higher light efficiency and higher luminance when the colored light generated by the solid-state light source is used as the illumination light without modification, it becomes possible to further enhance the light efficiency to thereby achieve further increase in luminance.

It should be noted that the projector 1002 according to the second embodiment has substantially the same configuration as that of the projector 1000 according to the first embodiment except the configuration of the illumination devices, and therefore, obtains the corresponding advantages out of the advantages the projector 1000 according to the first embodiment has without change.

Although the invention is explained hereinabove based on the embodiments described above, the invention is not limited to the embodiments described above. The invention can be put into practice in various forms within the scope and spirit of the invention, and the following modifications, for example, are also possible.

Figure 6:
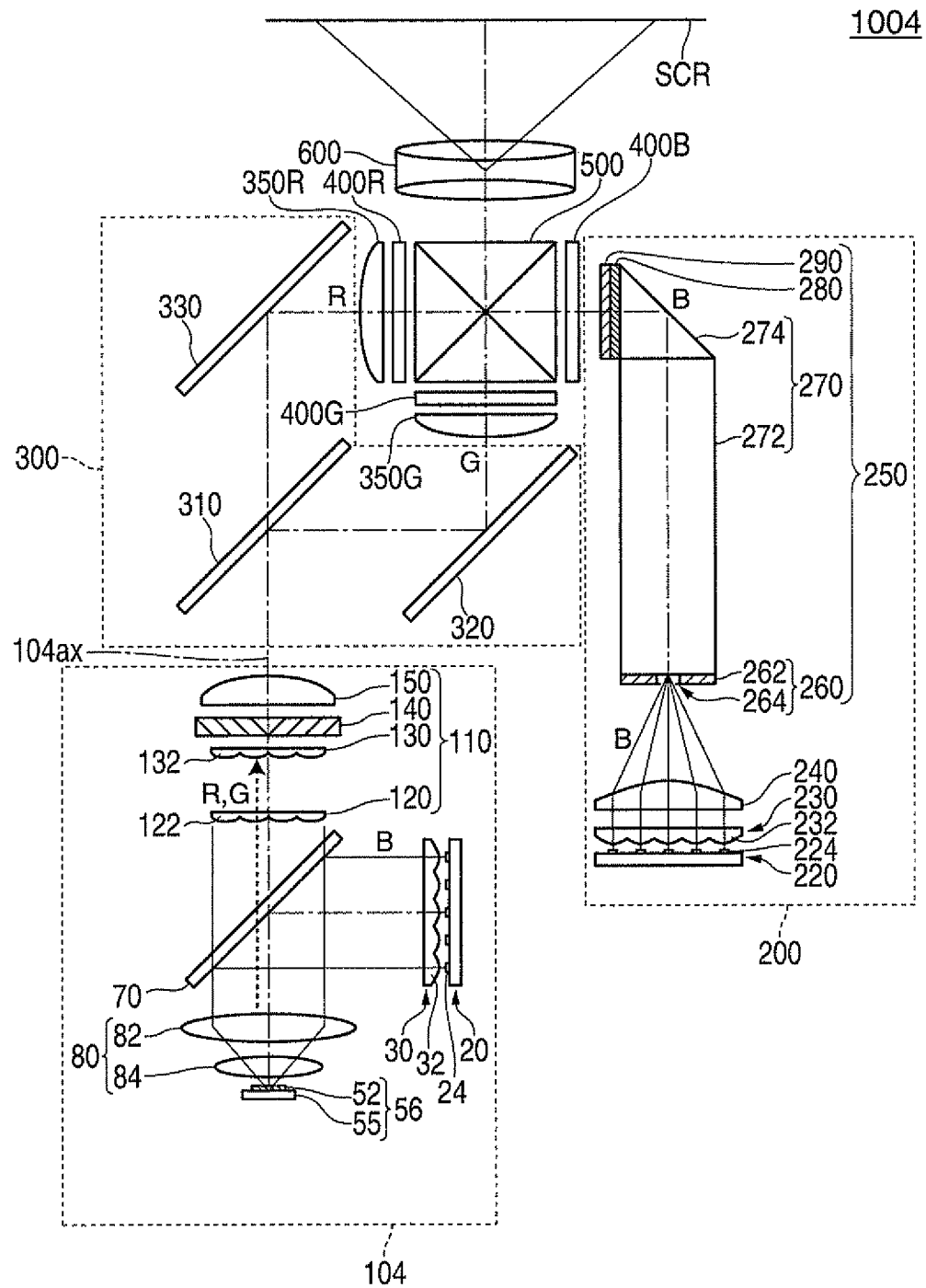
FIG. 6 is a plan view showing an optical system of a projector 1004 according to a first modified example.

1. Although in each of the embodiments described above a so-called transmissive fluorescence generation section is used as the fluorescence generation section, the invention is not limited thereto. FIG. 6 is a plan view showing an optical system of a projector 1004 according to a first modified example. As shown in FIG. 6, the projector 1004 according to the first modified example is provided with a first illumination unit 104 having a dichroic mirror 70 for reflecting the blue light and transmitting the red light and the green light, a fluorescence generation section 56 having the fluorescent layer 52 and a reflecting member 55 for supporting the fluorescent layer 52, and a light collection optical system 80 for collecting the light from the dichroic mirror 70 and at the same time roughly collimating the light from the fluorescence generation section 56. The fluorescence generation section 56 is a so-called reflective fluorescence generation section having the side, to which the excitation light (the blue light) is input, and the side, from which the generated fluorescence is emitted, located on the same side. For example, as shown in FIG. 6, a so-called reflective fluorescence generation section can also be adopted.

Figure 7:
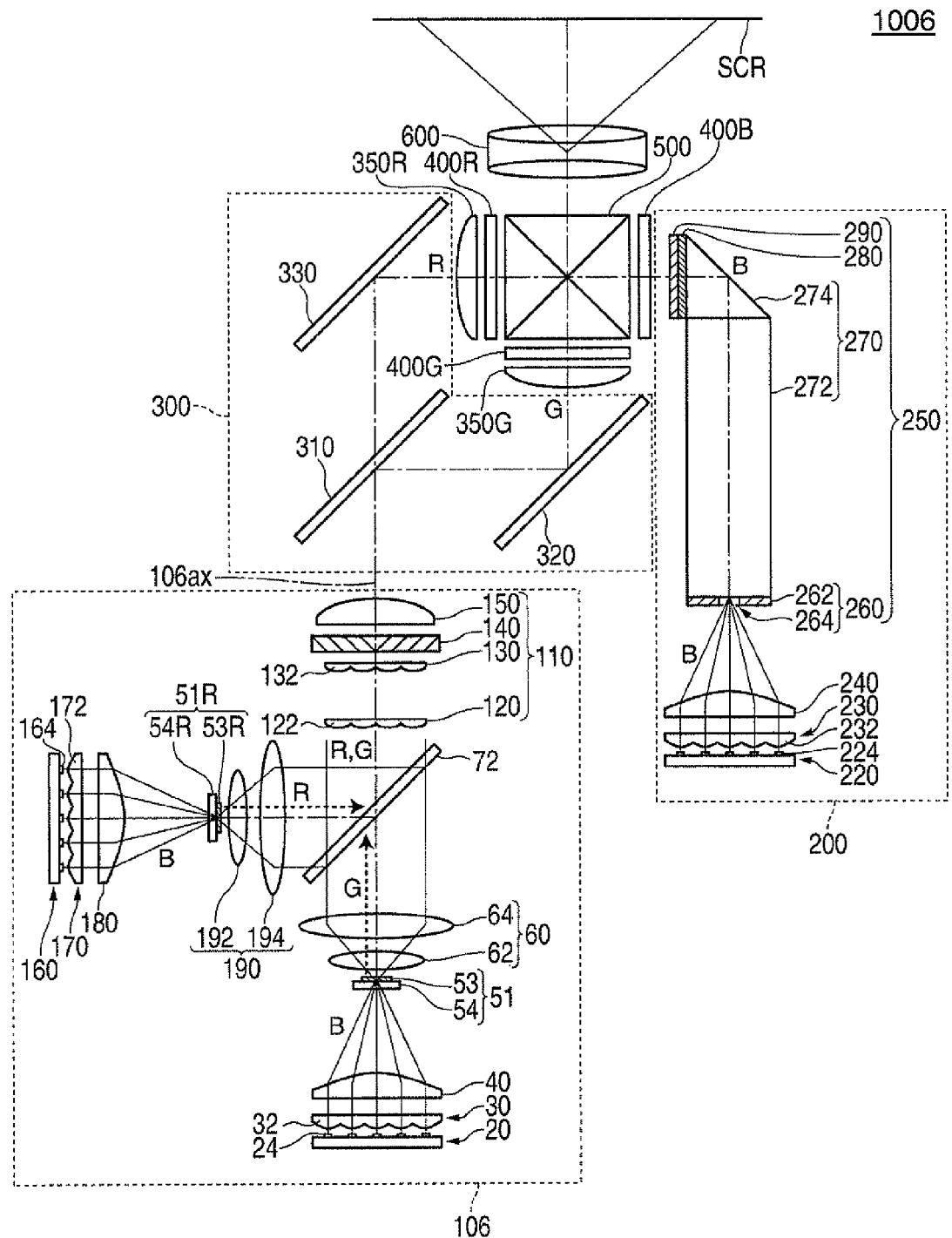
FIG. 7 is a plan view showing an optical system of a projector 1006 according to a second modified example.

2. Although in the first embodiment described above the fluorescence generation section 50 for generating the fluorescence including the red light and the green light from the blue light is used, the invention is not limited thereto. FIG. 7 is a plan view showing an optical system of a projector 1006 according to a second modified example.

As shown in FIG. 7, the projector 1006 according to the second modified example is provided with a first illumination unit 106 having first solid-state light source arrays 20, 160 respectively having a plurality of first solid-state light sources 24, 164 for generating the blue light, collimator lens arrays 30, 170, light collection optical systems 40, 180, the fluorescence generation section 51 for generating the fluorescence including the green light from the blue light, a fluorescence generation section 51R having a fluorescent layer 53R for generating a fluorescence including the red light from the blue light, collimating optical systems 60, 190, and a dichroic mirror 72 for reflecting the red light and transmitting the green light. For example, as shown in FIG. 7, it is also possible to use the fluorescence generation section for generating the fluorescence including the red light from the blue light and the fluorescence generation section for generating the fluorescence including the green light from the blue light.

Figure 8:
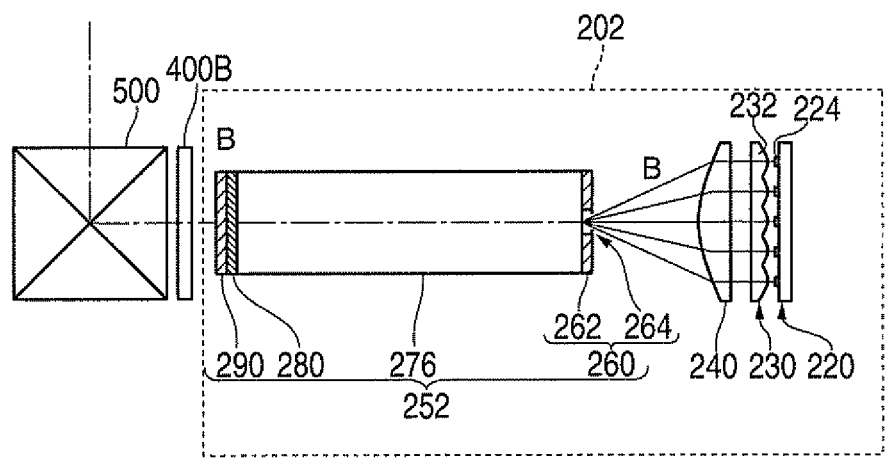
FIG. 8 is a plan view showing a part of an optical system of a projector 1008 (the reference numeral is not shown) according to a third modified example.

3. Although in each of the embodiments described above, the integrator rod having the prism section is used, the invention is not limited thereto. FIG. 8 is a plan view showing a part of an optical system of a projector 1008 (the reference numeral is not shown) according to a third modified example. Since the projector 1008 according to the third modified example has substantially the same configuration as that of the projector 1000 according to the first embodiment except the second illumination unit 202, FIG. 8 only illustrates the second illumination unit 202, the liquid crystal light modulation device 400B, and the cross dichroic prism 500. The reference numeral 276 denotes the integrator rod without the prism section (i.e., including only the rod section). For example, as shown in FIG. 8, it is also possible to use the integrator rod without the prism section.

Figure 9:
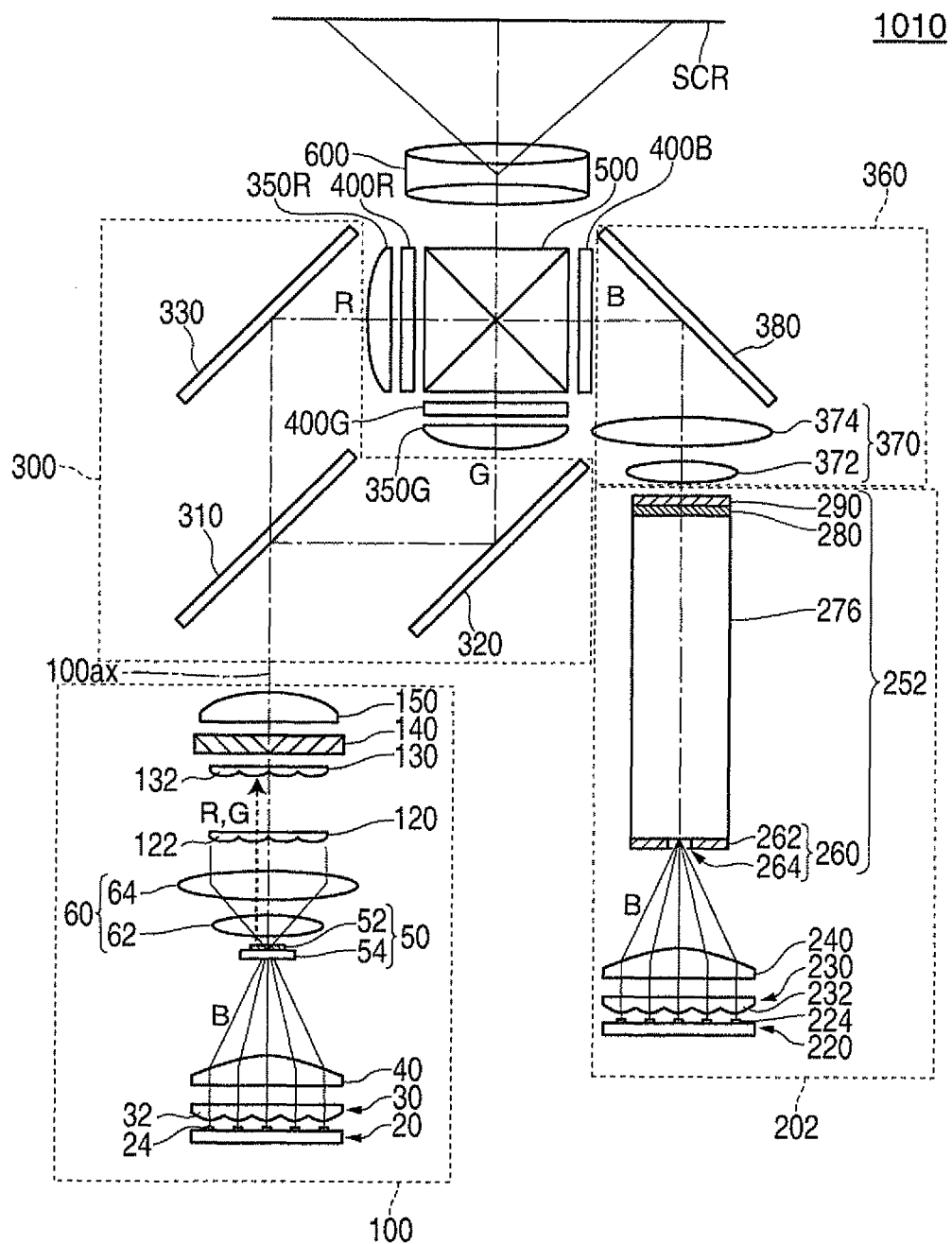
FIG. 9 is a plan view showing an optical system of a projector 1010 according to a fourth modified example.

4. Although in each of the embodiments described above, the rod integrator optical system having the exit surface disposed in the vicinity of the liquid crystal light modulation device is used, the invention is not limited thereto. FIG. 9 is a plan view showing an optical system of a projector 1010 according to a fourth modified example. As shown in FIG. 9, the projector 1010 according to the fourth modified example is provided with a second illumination unit 202 as the second illumination device, and is further provided with a light guide optical system 360 for guiding the blue light from the second illumination unit 202. The second illumination unit 202 has substantially the same configuration as that of the second illumination unit 202 in the third modified example. The light guide optical system 360 is provided with a light collection optical system 370 for preventing the spread of the blue light from the second illumination unit 202 and a reflecting mirror 380. For example, as shown in FIG. 9, in the projector provided with the light guide optical system, it is also possible to use the rod integrator optical system having the exit surface not disposed in the vicinity of the liquid crystal light modulation device.

Figure 10:
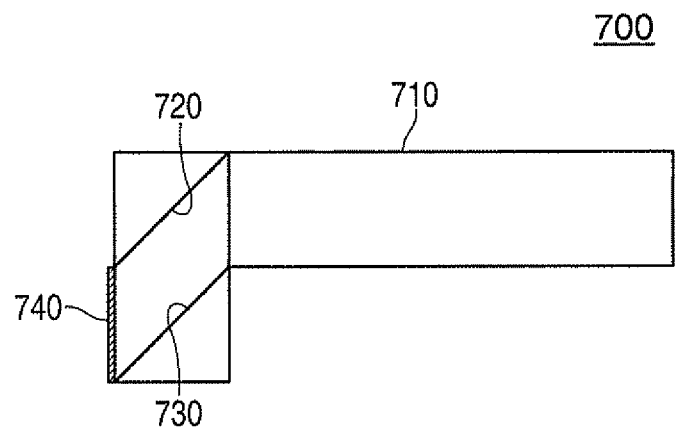
FIG. 10 is a top view of a rod integrator optical system 700 in a fifth modified example.

5. Although in each of the embodiments described above, the rod integrator optical system provided with the reflecting mirror 260, the integrator rod 270, the λ/4 plate 280, and the reflective polarization plate 290 is used, the invention is not limited thereto. FIG. 10 is a top view of a rod integrator optical system 700 in a fifth modified example. The rod integrator optical system 700 in the fifth modified example is provided with an integrator rod 710 for internally reflecting the light multiply, a polarization split layer 720 for transmitting one linear polarization component out of the polarization components included in the light from the integrator rod 710 and reflecting the other linear polarization component, a reflecting layer 730 for reflecting the other linear polarization component reflected by the polarization split layer 720, and a λ/2 plate 740 for converting the other linear polarization component reflected by the reflecting layer 730 into the one linear polarization component. In other words, the polarization split layer 720, the reflecting layer 730, and the λ/2 plate 740 can be regarded as a polarization conversion element for converting the light from the integrator rod 710 into the light consisting of a single linearly polarized light with a uniform polarization direction and emitting the light. It is also possible to use, for example, the rod integrator optical system shown in FIG. 10.

6. In each of the embodiments described above, it is also possible to further provide a λ/4 plate to the light collection optical system side of the reflecting mirror in the rod integrator optical system. In each of the embodiments described above, since the second solid-state light sources each formed of a semiconductor laser for emitting the colored light consisting of the linearly polarized light is used, by adopting the configuration described above, it becomes possible to input a large part of the colored light from the second solid-state light sources to the reflective polarization plate as the colored light consisting of the linearly polarized light by passing through the λ/4 plate twice, thus it becomes possible to improve the polarization conversion efficiency in the rod integrator optical system.

7. Although in each of the embodiments described above the fluorescence generation section fixed to a predetermined position is used, the invention is not limited thereto. It is also possible to use the fluorescence generation section configured to be able to rotate around a predetermined axis of rotation, and so that the position of the entrance area in the fluorescence generation section moves in accordance with the rotation of the fluorescence generation section.

8. Although in each of the embodiments described above, the collimator lens formed of the aspherical planoconvex lens with the hyperboloidal entrance surface and the planar exit surface is used, the invention is not limited thereto. It is also possible to use, for example, a collimator lens formed of an aspherical planoconvex lens with a planar entrance surface and an elliptical exit surface. Further, it is also possible to use a collimator lens composed of a plurality of lenses instead of the collimator lens formed of a single lens. In essence, it is sufficient to use a collimator lens disposed corresponding to the first solid-state light sources or the second solid-state light sources, and capable of roughly collimating the light generated by the corresponding solid-state light sources.

9. Although in each of the embodiments described above, the light collection optical system formed of the aspherical planoconvex lens with the planar entrance surface and the hyperboloidal exit surface is used, the invention is not limited thereto. It is also possible to use, for example, a light collection optical system formed of an aspherical planoconvex lens with an elliptical entrance surface and a planar exit surface. Further, it is also possible to use a light collection optical system composed of a plurality of lenses instead of the light collection optical system formed of a single lens. In essence, it is sufficient to use a light collection optical system capable of collecting the light from the collimator lens array to a predetermined collection position.

10. Although in each of the embodiments described above, the first solid-state light sources and the second solid-state light sources each formed of the semiconductor laser are used, the invention is not limited thereto. For example, the first solid-state light sources and the second solid-state light sources each formed of a light emitting diode can also be used.

11. Although in each of the embodiments described above the transmissive projector is used, the invention is not limited thereto. It is also possible to use, for example, a reflective projector. It should be noted here that "transmissive" denotes that the light modulation device as the light modulation section is a type of transmitting a light beam such as a transmissive liquid crystal display device, and "reflective" denotes that the light modulation device as the light modulation section is a type of reflecting a light beam such as a reflective liquid crystal display device. Also in the case in which the invention is applied to the reflective projector, the same advantages as in the case with the transmissive projector can be obtained.

12. Although in the first embodiment described above the explanation is presented showing, as an example, the projector using three light modulation devices, the invention is not limited thereto. The invention can also be applied to the projector using one, two, or four or more light modulation devices.

13. The invention can be applied to a front projection projector for performing projection from the side of observing the projected image, and also to a rear projection projector for performing projection from the side opposite to the side of observing the projected image.

The entire disclosure of Japanese Patent Application No. 2010-171625, filed Jul. 30, 2010 is expressly incorporated by reference herein.

What is claimed is:

1. A projector comprising:
an illumination device adapted to generate an illumination light;
a light modulation device adapted to modulate the illumination light from the illumination device in accordance with image information; and
a projection optical system adapted to project a light from the light modulation device,
wherein the illumination device includes
a first illumination device including at least one first solid-state light source adapted to generate an excitation light, a fluorescence generation section adapted to generate a fluorescence from the excitation light generated by the first solid-state light source, and a lens integrator optical system adapted to equalize an in-plane light intensity distribution of the fluorescence from the fluorescence generation section, and
a second illumination device including at least one second solid-state light source formed of a semiconductor laser adapted to generate a colored light, and a rod integrator optical system adapted to equalize an in-plane light intensity distribution of the colored light generated by the second solid-state light source,
wherein the rod integrator optical system includes
an integrator rod adapted to internally reflect the colored light multiply,
a reflecting mirror disposed on an entrance surface of the integrator rod, and provided with a colored light introduction hole adapted to introduce the colored light from the second solid-state light source,
a light collection lens adapted to collect the colored light and to direct the colored light to the colored light introduction hole of the reflecting mirror,
a λ/4 plate disposed on an exit surface of the integrator rod, and
a reflective polarization plate disposed on an exit surface of the λ/4 plate.

2. The projector according to claim 1, wherein
the first illumination device includes a plurality of the first solid-state light sources, and
the second illumination device includes a plurality of the second solid-state light sources.

3. The projector according to claim 1, wherein
the first solid-state light source and the second solid-state light source are each formed of a semiconductor laser.

4. The projector according to claim 1, wherein
the lens integrator optical system is configured so as to emit a fluorescence with a uniform polarization direction as the fluorescence, and
the rod integrator optical system is configured so as to emit a colored light with a uniform polarization direction as the colored light.

5. The projector according to claim 1, wherein
the second illumination device further includes a scattering member adapted to input the colored light to the integrator rod in a scattered state.

6. The projector according to claim 1, wherein
the first illumination device includes a first illumination unit adapted to emit both of a red light and a green light, and
the second illumination device includes a second illumination unit adapted to emit a blue light.

7. The projector according to claim 1, wherein
the first illumination device includes a first illumination unit adapted to emit a green light, and
the second illumination device includes two second illumination units, one being adapted to emit a red light, and the other being adapted to emit a blue light.

8. The projector according to claim 6, wherein
the first solid-state light source generates a blue light having an intensity peak in a range of 430 nm through 450 nm, and
the second solid-state light source in the second illumination unit adapted to generate the blue light generates the blue light having an intensity peak in a range of 450 nm through 480 nm.

* * * * *